(12) United States Patent
Woerlee et al.

(10) Patent No.: US 8,226,984 B2
(45) Date of Patent: Jul. 24, 2012

(54) PROCESS FOR THE PREPARATION OF ENCAPSULATES THROUGH PRECIPITATION

(75) Inventors: Geert Feye Woerlee, Haarlem (NL); Gerard Willem Hofland, Hoogmade (NL); Pieter Sebastiaan Vermeulen, Utrecht (NL)

(73) Assignee: Feyecon Development & Implementation B.V., Weesp (NL)

( * ) Notice: Subject to any disclaimer, the term of this patent is extended or adjusted under 35 U.S.C. 154(b) by 1125 days.

(21) Appl. No.: 12/063,680

(22) PCT Filed: Aug. 23, 2006

(86) PCT No.: PCT/NL2006/050208
§ 371 (c)(1),
(2), (4) Date: Feb. 13, 2008

(87) PCT Pub. No.: WO2007/024133
PCT Pub. Date: Mar. 1, 2007

(65) Prior Publication Data
US 2008/0213380 A1 Sep. 4, 2008

(30) Foreign Application Priority Data
Aug. 23, 2005 (EP) ..................................... 05107732

(51) Int. Cl.
*A61K 9/16* (2006.01)
*A61K 9/66* (2006.01)

(52) U.S. Cl. ........................................ 424/490; 424/455
(58) Field of Classification Search .................. 424/490, 424/455
See application file for complete search history.

(56) References Cited

U.S. PATENT DOCUMENTS

| 5,424,076 A | 6/1995 | Gorissen et al. |
| 5,766,637 A | 6/1998 | Shine et al. |
| 2004/0071781 A1 | 4/2004 | Chattopadhyay et al. |

FOREIGN PATENT DOCUMENTS
EP 0 850 682 A1 7/1998

*Primary Examiner* — Fereydoun G Sajjadi
*Assistant Examiner* — Genevieve S Alley
(74) *Attorney, Agent, or Firm* — Young & Thompson

(57) ABSTRACT

A process for the preparation of encapsulates, employs: a pumpable emulsion having (i) a continuous phase containing a solvent and a matrix-forming solute dissolved in the solvent and (ii) a dispersed phase; an extractant including supercritical, subcritical or liquefied gas; the solvent being substantially more soluble in the extractant than the matrix-forming solute and the process including the successive steps of: a) combining the pumpable emulsion with the extractant under mixing conditions; b) allowing the formation of particulate encapsulates in which the dispersed phase is encased in a solid matrix of the matrix-forming solute; c) collecting the encapsulates and separating them from the extractant. The present processes is particularly suitable for producing particles containing active ingredients that are very sensitive, whose activity is adversely affected by exposure to oxygen, light, moisture, heat and/or friction.

13 Claims, No Drawings

PROCESS FOR THE PREPARATION OF ENCAPSULATES THROUGH PRECIPITATION

TECHNICAL FIELD OF THE INVENTION

The present invention is concerned with a process for the preparation of particles through precipitation, which process employs (i) a pumpable fluid comprising a solvent and a matrix-forming solute to be precipitated and (ii) an extractant in the form of a supercritical, subcritical or liquefied gas, said solvent being substantially more soluble in the extractant than said matrix-forming solute and said process comprising:
- combining the pumpable fluid with the extractant;
- allowing the formation of particles comprising the matrix-forming solute;
- collecting the particles and separating them from the extractant.

BACKGROUND OF THE INVENTION

Precipitation processes as described above are known in the art and are typically used to produce nano- and microparticles, i.e. particles with average diameters that are typically in the range of 100 nm to 80 µm.

It has been suggested in the prior art to employ the aforementioned precipitation process for the preparation of particles containing an active ingredient dispersed in a carrier material. DE-A 37 44 329 describes a process for the preparation of a composition comprising an active ingredient, e.g. a pharmaceutically active substance, and a carrier material in which a liquid containing the active ingredient and the carrier material is contacted with a fluid gas, e.g. supercritical carbon dioxide; the liquid is extracted by the fluid gas and the composition containing the active ingredient and the carrier material is recovered in the form of small particles. This process offers the advantage that it enables the manufacture of preparations that do not contain solvent residues or that contain solvent residues in toxicologically harmless amounts.

WO 2004/04862 describes a method of producing particles comprising contacting an emulsion with a supercritical fluid, the emulsion having a continuous phase and a discontinuous phase, the discontinuous phase comprising a solvent having a solute dissolved therein, the solute being generally insoluble in the continuous phase, and the solvent in the discontinuous phase being soluble in the supercritical fluid; and extracting the solvent from the discontinuous phase of the emulsion and into the supercritical fluid to precipitate the solute and thereby form particles of solute suspended in the continuous phase. The solute is preferably a substance that is insoluble or slightly soluble in water. The discontinuous phase is typically an organic solvent or an oil. The continuous phase is preferably water. The method described in WO 2004/04862 can yield particles of solute having a high purity and a narrow particle size distribution. These particles may be isolated from the continuous phase in which they are suspended by means of ultra-filtration or high-speed centrifugation.

The above mentioned processes are less suitable for producing particles containing active ingredients that are very sensitive, e.g. ingredients whose activity is adversely affected by exposure to oxygen, light, moisture, heat and/or friction. Furthermore, upon application, the particles produced by the above methods will instantaneously start releasing the active ingredients contained therein whereas it is often desirable that such release occurs with a certain delay.

SUMMARY OF THE INVENTION

The inventors have found that it is feasible to produce encapsulates that do not suffer from these drawbacks by means of a process that employs:
- a pumpable emulsion comprising (i) a continuous phase containing a solvent and a matrix-forming solute dissolved in said solvent and (ii) a dispersed phase;
- an extractant comprising supercritical, subcritical or liquefied gas; said solvent being substantially more soluble in the extractant than said matrix-forming solute; and that comprises the successive steps of:
a. combining the pumpable emulsion with the extractant under mixing conditions;
b. allowing the formation of particulate encapsulates in which the dispersed phase is encased in a solid matrix of the matrix-forming solute;
c. collecting the encapsulates and separating them from the extractant.

Unexpectedly, it was found that the process of the present invention yields particles comprising the dispersed phase of the pumpable emulsion embedded in a matrix of precipitated solute. In the present process, the continuous phase of the emulsion is selectively extracted by the extractant. Thus, the solute contained in the continuous phase precipitates around the dispersed phase, yielding encapsulates in which said dispersed phase is effectively encased in a matrix of precipitated solute that protects the dispersed phase from the surrounding environment. The encapsulates obtained in the present process can be separated from the extractant by pressure reduction. Surprisingly, it was found that even if the extractant has a high affinity for the dispersed phase, effective encapsulation of the dispersed phase in the solute matrix can be achieved.

DETAILED DESCRIPTION OF THE INVENTION

Accordingly, one aspect of the invention relates to a process for the preparation of encapsulates, which process employs:
- a pumpable emulsion comprising (i) a continuous phase containing a solvent and a matrix-forming solute dissolved in said solvent and (ii) a dispersed phase;
- an extractant comprising supercritical, subcritical or liquefied gas; said solvent being substantially more soluble in the extractant than said matrix-forming solute and said process comprising the successive steps of:
a. combining the pumpable emulsion with the extractant under mixing conditions;
b. allowing the formation of particulate encapsulates in which the dispersed phase is encased in a solid matrix of the matrix-forming solute;
c. collecting the encapsulates and separating them from the extractant.

The term "subcritical gas" as used herein refers to a compressed gas that is neither in a supercritical or liquefied state but that has been pressurised to at least 10 bar, preferably to at least 20 bar.

The encapsulates obtained by the present method are characterised in that the dispersed phase has a composition that differs from the solid matrix that surrounds it and that preferably is essentially insoluble in said matrix.

In a particularly advantageous embodiment of the invention the dispersed phase of the pumpable emulsion contains one or more active ingredients, preferably at least 1 wt. %, more preferably at least 10 wt. % of one or more active ingredients. The dispersed phase of the pumpable emulsion may consist of one or more active ingredients or, alternatively, it may contain such active ingredients dissolved and/or dispersed in a carrier material.

Examples of active ingredients that advantageously can be incorporated in the dispersed phase of the pumpable emulsion include: pharmaceutical substances, sterols, tocopherols, tocotrienols, carotenoids, simple phenols, essential oils, vitamins, flavouring substances and mixtures thereof. Examples of pharmaceutical substances that may advantageously be encapsulated by the present method include: local anesthetics (e.g. procaine), antimalarial agents (e.g. chloroquine), adrenergic receptor antagonists (e.g. propanolol), anti-neoplastic agents (e.g. doxorubicin), antihistaminics, antidepressants (e.g. desipramine), anticholinergics (e.g. atropine), antiarrhythmics (e.g. quinidine), analgesics (e.g. codeine, morphine) and prostaglandins.

The dispersed phase employed in the present process preferably contains at least 10 wt. %, more preferably at least 50 wt. % of an lipophilic material. Here the term "lipophilic material" refers to any material that is essentially insoluble in water. Typically, the solubility of the lipophilic material in water of 20° C. does not exceed 0.5 wt. %, preferably it does not exceed 0.05 wt. %. Besides lipophilic material, the dispersed phase may contain polar material, especially liquid polar material, that is present as a dispersed phase in the lipophilic material. For instance, the dispersed phase may suitably be a water-in-oil emulsion wherein the dispersed aqueous phase contains a water-soluble active ingredient. Examples of liquid polar materials that may be contained as a dispersed phase in the lipophilic material include water, $C_1$-$C_4$ alkanols, DMSO, and mixtures thereof. According to a particularly preferred embodiment, the liquid polar material that is dispersed in the lipophilic material contains an active ingredient, especially a pharmaceutically active ingredient. The encapsulation of such an emulsion offers the advantage that the active ingredient is released from the encapsulate at a very slow rate. This is particularly advantageous in pharmaceutical applications, especially in oral dosages that contain water-soluble, pharmaceutically active ingredients that should be protected from the acid conditions prevailing in the stomach.

In an advantageous embodiment, the dispersed phase of the pumpable emulsion contains an lipophilic carrier material and one or more active ingredients dispersed or dissolved in said lipophilic carrier material. In case the dispersed phase contains one or more active ingredients in combination with a lipophilic carrier material, said one or more active ingredients are preferably dissolved in the dispersed phase. Examples of lipophilic carrier materials that can suitably be employed include lipids, waxes (e.g. bees wax or palm wax), essential oils (e.g. lavender, peppermint or eucalyptus oil) and synthetic oils (e.g. triethyl glycol and diethylglycerol). A preferred lipophilic carrier material are lipids. The term "lipids" as used herein refers to a broad class of organic products found in living systems that are insoluble in water as well synthetic derivatives thereof. Major classes of lipids include fatty acids and their derivatives (including cetylated fatty acids), steroids and their derivatives, terpenes and their derivatives, long-chain alcohols. Most preferably, the lipids employed in the dispersed phase are fatty acid glycerol esters (e.g. triglycerides, diglycerides, monoglycerides, phosphatides).

The dispersed phase may be liquid, semi-solid or solid. Preferably, the dispersed phase is a liquid under ambient conditions, or alternatively it can be melted by heating it to a temperature of not more than 100° C., preferably of not more than 80° C., more preferably of not more than 65° C.

The dispersed phase of the pumpable emulsion advantageously contains at least 10 wt. %, preferably at least 30 wt. %, more preferably at least 50 wt. % of an active ingredient containing extract, which extract is obtained through extraction with a subcritical, liquefied or supercritical gas. Due to the mild conditions (e.g. less than 50° C.) employed during extraction with a pressurised gas it is possible to effectively concentrate substances that retrograde at elevated temperatures and/or in the presence of oxygen or moisture. The present invention provides a method that can advantageously be used to encapsulate these sensitive extracts without corrupting the active ingredients contained therein. In contrast, encapsulation techniques such as spray drying, will cause massive degradation of the sensitive active ingredients.

The matrix-forming solute is suitably selected from the group consisting of carbohydrates and derivatives thereof (e.g. modified dextrans, starch derivatives, cellulose derivatives, water soluble gums, carrageenan, agar, pectin, cyclodextrins and polyols such as mannitol), proteins (e.g. casein), peptides, amino acids, polymers (e.g. polyvinyl alcohol), surfactants and combinations thereof. Suitable examples of water-soluble gums include gum arabic, guar gum, karaya gum and xanthan gum. Most preferably, the matrix-forming solute is selected from the group consisting of maltodextrins, proteins (e.g. milk proteins) and combinations thereof.

According to a particularly preferred embodiment of the present process, the solvent contains water, the extractant contains carbon dioxide and the solute employed precipitates under acidic conditions, notably at a pH of less than 6.0. Because the reaction between carbon dioxide and water will cause a pH decrease, the use of an acid precipitating solute further accelerates the precipitation of the solute. Examples of acid precipitating solutes include proteins, organic acids, polymers and salts. Preferably, the acid precipitating solute is a protein with an iso-electric point in the range pH 3.0 to pH 6.0, more preferably with an iso-electric point in the range of pH 3.2 to pH 5.5.

The extractant employed in the present process may consist of a single substance or alternatively it may consist of a mixture of substances. Thus, the extractant may also comprise a mixtures of gases in supercritical, subcritical or liquefied state. Typically, the extractant contains at least 50 wt. %, preferably at least 70 wt. % of supercritical, subcritical or liquefied gas. The extractant may suitably contain co-solvents up to a level of 10 wt. %, preferably up to a level of not more than 5 wt. %. Examples of suitable co-solvents include $C_1$-$C_3$ alkanols, acetone, DMSO and combinations thereof.

The supercritical, subcritical or liquefied gas employed in the present process is preferably selected from the group consisting of carbon dioxide, nitrous oxide, ethane, ethylene, propane, cyclopropane, propylene, butane, argon, nitrogen and mixtures thereof.

The solvent employed in the present process is suitably a liquid or a gas in a supercritical, subcritical or liquefied state. Preferably, the solvent employed is a liquid. The solvent comprised in the pumpable emulsion advantageously contains at least 50 wt. %, preferably at least 80 wt. % of a polar liquid selected from the group consisting of water, $C_1$-$C_4$ alcohols, DMSO and mixtures thereof. Most preferably, the polar liquid is water.

The continuous phase of the pumpable emulsion may contain additional dissolved components besides the matrix-forming solute, e.g. stabilisers, salts, lower alcohols or other water-soluble organic solvents, antibiotics, antifungal agents, antimyotic agents or antioxidants. The continuous phase may suitably contain one or more active components that have a combined action with an active component that is present in the dispersed phase. Preferably, at least 90 wt. %, more preferably at least 95 wt. % of the continuous phase consists of solvent and matrix-forming solute.

The present pumpable emulsion may suitably contain one or more emulsifiers. These emulsifiers may be employed to facilitate the preparation of the pumpable emulsion and/or to stabilise said emulsion. Any combinations of solvent and extractant may suitably be employed in the present method, provided the solvent is soluble in the extractant and the solute is substantially insoluble in the extractant. Here the term "soluble" means that, under the extraction conditions employed in the process, the solubility of the solvent in the extractant exceeds 0.1% (w/w), preferably exceeds 0.5% (w/w).

Generally, solubility of the solute in the extractant does not exceed 5% (w/w). Preferably, under the extraction conditions employed in the present process solubility of the solute in the extractant is at least 100, more preferably at least 1000 times lower than the solubility of the solvent in the same extractant.

The inventors have unexpectedly found that excellent results can be obtained with the present method even if the dispersed phase is equally or even more soluble in the extractant as the solvent. Although the inventors do not wish to be bound by theory, it is believed that the solubility of the dispersed phase in the solvent is conversely correlated with the efficacy of the present method. Accordingly, the solubility of the dispersed phase in the solvent preferably does not exceed 0.1 wt. %, more preferably it does not exceed 0.01 wt. %. In case the dispersed phase comprises an emulsion, the continuous phase of said emulsion should meet the aforementioned solubility criteria.

The pumpable emulsion employed in the present process suitably contains between 5 and 60 wt. %, preferably between 30 and 50 wt. % of the dispersed phase. The amount of solute contained in the emulsion is typically between 20 and 90%, preferably between 30 and 50% by weight of solvent. The matrix-forming solute and the dispersed phase are preferably contained in the pumpable emulsion in a weight ratio of 1:15 to 10:1, preferably of 1:12 to 2:1.

The payload of the encapsulates obtained by the present process is typically at least 5%, preferably at least 30%, most preferably at least 50%. Usually, the payload does not exceed 90%. Here the payload equals the wt. % of dispersed phase contained in the encapsulate.

The present method typically yields encapsulates with a volume weighted mean diameter in the range of 3-300 µm, preferably of 10-100 µm. In order to ensure that the dispersed phase of the pumpable emulsion is effectively encased within the solute matrix it is advisable to employ a dispersed phase having a volume weighted average droplet size of 0.1-30 µm.

The process of the invention can be suitably used in a variety of technical fields such as those related to pharmaceuticals, foods, agriculture, coatings, adhesives and catalysts. In particular, the present process may be used to encapsulate pharmaceutically active substances, nutraceuticals, flavourings, enzymes, colourings, pesticides and herbicides.

The process according to the present invention can suitably be carried out in a batch-wise, semi-continuous or continuous fashion. In a batch-wise version of the present process, the pumpable emulsion may be sprayed into a chamber filled with the extractant or it may be fed into such a chamber whilst being stirred vigorously. In a preferred continuous variant of the present process the pumpable emulsion and the extractant are continuously combined by feeding a stream of the pumpable emulsion and a stream of the extractant into a mixing zone where both streams are thoroughly mixed.

The pumpable emulsion of the present process is advantageously combined with the extractant by spraying the emulsion into a mixing zone containing the extractant by means of a nozzle with an inner diameter of more than 1 mm. The use of a nozzle with a relatively large diameter offers the advantage that the emulsion is not broken upon introduction into the mixing zone.

In the present process the emulsion and the extractant are typically admixed in a weight ratio within the range of 1:1000 to 1:10, preferably in a weight ratio within the range of 1:200 to 1:50.

In the present process contact time between extractant and the precipitated encapsulates is preferably kept as short as possible in order to prevent that the dispersed phase is extracted from the encapsulates. Typically, average contact time between encapsulates and extractant does not exceed 3 hours. More preferably, said contact time does not exceed 60 minutes. Even more preferably the contact time does not exceed 30 minutes, most preferably it does not exceed 10 minutes. According to a particularly preferred embodiment, the encapsulates are separated from the extractant whilst precipitation continues. This may be achieved, for instance, with the help of a cyclone or by collecting the particles in a medium that is immiscible with extractant.

In a preferred embodiment of the present process, following separation of the extractant, the extracted solvent is removed from the extractant and the extractant is recirculated to step a. of the process. Thus, the total amount of extractant employed in the process may be minimised without significant adverse effects on process efficiency or encapsulate quality. In a particularly preferred embodiment, the extracted solvent is effectively removed in a highly selective fashion. By removing the solvent and not, for instance, dissolved components of the dispersed phase, undesired extraction of the dispersed phase from the encapsulates may be avoided. Advantageously, the solvent is removed with an efficiency that is at least 10 times, preferably at least 100 times higher than the removal of dispersed phase components.

Solvent may be removed effectively from the extractant by employing an adsorbent or absorbent that adsorbs/absorbs the solvent but not the extractant. Alternatively, solvent is removed by reducing the pressure or temperature of the solvent-containing extractant to allow the solvent to condense. It is also feasible to remove the solvent by using selective membranes. Following separation of the extractant from the condensed solvent, the extractant is repressurised before being recirculated to step a. In a particularly preferred embodiment the solvent contains water and the extracted water is removed from the extractant by contacting the extractant with a water adsorbent or a water absorbent that is insoluble in said extractant.

The pumpable emulsion of the present process is suitably formed by combining the solvent with the one or more active ingredients and/or lipophilic carrier materials that are to constitute the dispersed phase, accompanied by or followed by homogenisation. Preferably, said one or more active ingredients and lipophilic carrier material are combined with the solvent when they are in a liquid or liquefied state.

In the present process the extractant, when it is combined with the pumpable emulsion, preferably has a pressure of at least 10 bar, even more preferably of at least 20 bar. According to a particularly preferred embodiment, the extractant is a liquefied or supercritical gas having a pressure of at least $0.3 \times P_c$ and a temperature of at least $T_c - 60°$ C., $P_c$ representing the critical pressure of the gas and $T_c$ representing the critical temperature of the gas.

The invention is further illustrated by means of the following examples.

EXAMPLES

Example 1

Sodium caseinate and maltodextrin were dissolved together in water in concentrations of 3% and 20% by weight, respectively. Sunflower oil was dispersed into this solution, using an Ultraturrax™ stirrer, until a stable emulsion had formed. The resulting oil-in-water emulsion contained 25 wt. % oil.

The emulsion was transferred into a syringe pump (ISCO 260D) at ambient temperature. A high pressure vessel was pressurized with carbon dioxide using a plunger pump (Williams) and heated to 75° C. by means of a jacket, using heating oil. Carbon dioxide and the emulsion were sprayed into the vessel via a two-fluid nozzle, consisting of two concentric tubes; the emulsion via inner tube (1.5 mm) and the carbon dioxide via the outer tube (2.5 mm). The carbon dioxide was heated to 75° C. before being sprayed.

The powder that formed within the vessel was collected on a filter at the bottom of the vessel. The wet carbon dioxide left the vessel via the bottom of the vessel and was circulated over a pressure vessel filled with a granulates of zeolite 3 A using a high pressure centrifugal pump.

The pressure in the vessels was controlled at 152 bar by a valve in the exit tube, which was preceded by an heat exchanger, in which the gas was heated to 120° C.

The flow rates employed were 0.5 ml/min and 382 g/min for emulsion and carbon dioxide, respectively. The result was a white free flowing powder. The yield, based on the mass of the sprayed emulsion excluding the water present in the emulsion, was 98%

Example 2

11.15 g inuline was dissolved in 30 ml water (80° C.). When a clear solution had formed, it was cooled to 60° C. and 1.62 g whey powder and 1.0 g Tween-20 were added. The resulting mixture was mixed with 5.98 gram molten cannabis extract at 60° C. and sonicated using a ultrasonic probe (175 Watt) during 10 min.

The resulting emulsion was sprayed together with $CO_2$ via a two-fluid nozzle into a pressurised high pressure vessel (6 liter) using a syringe pump (Isco 260D). The vessel was heated via a jacket to 40° C. and pressurized to 30 bar. The pressure is controlled using a needle valve mounted to the bottom of the vessel. The vessel is equipped with a stainless steel sintered filter plate, located at the bottom in the vessel. The flow rates employed were 0.9 ml/min and 480 g/min, for emulsion and carbon dioxide respectively. After having stopped spraying, another 3 kg of carbon dioxide was flushed through the vessel. Carbon dioxide was not recycled.

A dry powder was obtained. The material exhibited superior protection to chemical degradation of the cannabis components by oxygen and water in air. When stored under ambient conditions for 5 weeks, 52% of pure THC was found to have degraded (HPLC analysis). In contrast only 2% of THC present in the encapsulate was degraded under these same storage conditions.

Example 3

1.2 g inuline from dahlia tubers (Fluka, MW 5000) was dissolved in 24 mL hot water (80° C.) in a beaker by means of sonication with a ultrasonic probe. Next, 300 mg of cannabis extract was thoroughly mixed with 2-butanol (3 ml) and the resulting solution was filtered over glasfilter No 3. Both solutions were heated to 60° C. and mixed together in a ratio 1:8 (v/v) (cannabis solution:inuline solution) in a high shear mixer for 15 min.

Next, the same procedure was followed as in example 2. However, this time carbon dioxide was used at 80° C. and pressurized to 180-200 bar. The flow rates employed were 1 ml/min and 330 g/min, for emulsion and carbon dioxide respectively.

A dry powder was obtained in a yield of 95%.

Example 4

β-Carotene was dissolved in sunflower oil in a ratio of 0.050 g β-carotene per 300 g of oil. The oil was dispersed in an aqueous solution of maltodextrin (23 wt. %) and sodium caseinate (2 wt. %), using a Ultraturrax™ mixer for 5 min. A yellow emulsion formed which contained 30 wt. % of oil.

Next, the same procedure was followed as in example 2. However, this time carbon dioxide was preheated to 75° C. and used at a pressure of 150 bar. The flow rates employed were 1.1 ml/min and 550 g/min, for emulsion and carbon dioxide respectively. A creamy white powder was formed.

Thermal analysis showed the residual water content was 5%. Redispersion of the powder in water (1:4, on weight basis) resulted in a creamy white emulsion, indicating that the oil phase with β-carotene is not released immediately. Upon extraction with an 1:2.5 (w/w) hexane/acetone mixture two transparent phases formed: a yellow top phase and a colourless bottom phase, confirming that β-carotene had been encapsulated in the powder. VIS spectrometry (460 nm) of this upper phase (no further dilution) indicated no significant loss of β-carotene had taken place during water-extraction.

Example 5

Peppermint oil emulsions were made using OSA modified starch (Capsul™) and maltodextrin as matrix-forming solutes. Peppermint oil mainly consists of menthol, mentone, methyl acetate and menthofuran. The compositions of the emulsions are described in Table 1.

TABLE 1

| (Composition of the emulsions in weight parts) | | | |
|---|---|---|---|
| Peppermint oil | Maltodextrin | Modified starch | Water |
| A | 8 | 16 | 16 | 60 |
| B | 8 | 16 | 16 | 60 |
| C | 8 | 16 | 16 | 60 |
| D | 14 | 16 | 16 | 60 |

Next, the same procedure was followed as in example 2. However, this time different pressures and temperatures were used. In experiment B, the emulsion was sprayed from a smaller tube (0.4 mm) The carbon dioxide flow rate that was employed was 550 g/min. The vessel temperature was kept at 40° C. Other processing conditions employed and yields are described in Table 2. In this table, the expected oil content is based on a water content in the powders of 5%.

TABLE 2

(Processing conditions and yields)

| | Pressure | Temp. | Emulsion flow rate | Measured oil content | Expected oil content | Retained oil |
|---|---|---|---|---|---|---|
| A | 30 bar | 45° C. | 0.15 ml/min | 16 wt. % | 19 wt. % | 86% |
| B | 30 bar | 45° C. | 0.15 ml/min | 15 wt. % | 19 wt. % | 77% |
| C | 190 bar | 65° C. | 1 ml/min | 16 wt. % | 21 wt. % | 85% |
| D | 190 bar | 65° C. | 1 ml/min | 19 wt. % | 32 wt. % | 66% |

Powders were formed in all four cases. The oil content of the powder was measured on the basis of its four most predominant components, using a gas chromatograph method. Sample preparation comprised redispersion of the powder in a 19:5 (w/w) water/acetone mixture. After 12 h the resulting solution was analysed.

After resuspension, a emulsion was formed that remained stable after centrifugation at 1000 rpm for 5 min, i.e. that did not display separation or sedimentation.

Example 6

An emulsion similar to experiment 5D containing hexane instead of peppermint oil was dried at 30 bar, at 45° C. Other process conditions were the same as in experiment 5A. Gravimetrical analysis showed that more than 85% of the hexane in the emulsion was retained in powder.

The invention claimed is:

1. A process for the preparation of encapsulates, which process employs:
   a pumpable emulsion comprising (i) a continuous phase containing a solvent and a matrix-forming solute dissolved in said solvent and (ii) a dispersed phase;
   an extractant comprising supercritical, subcritical or liquefied gas;
   the solubility of said matrix-forming solute in the extractant under extraction conditions being at least 100 times lower than the solubility of the solvent in the same extractant, and said process comprising the successive steps of:
   a. combining the pumpable emulsion with the extractant under mixing conditions;
   b. allowing the formation of particulate encapsulates in which the dispersed phase is encased in a solid matrix of the matrix-forming solute;
   c. collecting the encapsulates and separating them from the extractant.

2. The process according to claim 1, wherein the pumpable emulsion and the extractant are combined by feeding a stream of the pumpable emulsion and a stream of the extractant into a mixing zone where both streams are thoroughly mixed by spraying the emulsion into a mixing zone containing the extractant.

3. The process according to claim 1, wherein the pumpable emulsion contains the matrix-forming solute and the dispersed phase in a weight ratio of 1:15 to 10:1.

4. The process according to claim 3, wherein the pumpable emulsion contains the matrix-forming solute and the dispersed phase in a weight ratio of 1:12 to 2:1.

5. The process according to claim 1, wherein the dispersed phase has a volume weighted average droplet size of 0.1-30 μm.

6. The process according to claim 1, wherein the emulsion and the extractant are admixed in a weight ratio within the range of 1:1000 to 1:10.

7. The process according to claim 1, wherein the extractant is selected from the group consisting of carbon dioxide, nitrous oxide, ethane, ethylene, propane, cyclopropane, propylene, butane, argon, nitrogen and mixtures thereof.

8. The process according to claim 1, wherein the extractant is a liquefied or supercritical gas having a pressure of at least $0.3 \times P_c$ and a temperature of at least $T_c - 60°$ C., $P_c$ representing the critical pressure of the gas and $T_c$ representing the critical temperature of the gas.

9. The process according to claim 1, wherein the solvent contains at least 50 wt.% of a polar liquid selected from the group consisting of water, $C_1$-$C_4$ alcohols, DMSO and mixtures thereof.

10. The process according to claim 9, wherein the solvent contains at least 80 wt.% of a polar liquid selected from the group consisting of water, $C_1$-$C_4$ alcohols, DMSO and mixtures thereof.

11. The process according to claim 1, wherein the matrix-forming solute is selected from the group consisting of carbohydrates and derivatives thereof, proteins, peptides, amino acids, polymers, surfactants and combinations thereof.

12. The process according to claim 1, wherein the separated encapsulates have a volume weighted average diameter of 10-100 μm.

13. The process according to claim 1, wherein the solvent contains water, the extractant contains carbon dioxide and the solute employed precipitates at a pH of less than 6.0.

* * * * *